United States Patent Office 2,697,680
Patented Dec. 21, 1954

2,697,680

METHOD OF USING METHYLOL PICOLINES AS INSECT REPELLENTS

Carolyn E. Tissol, Minneapolis, Minn., and Lyle D. Goodhue, Bartlesville, Okla., assignors to Phillips Petroleum Company, a corporation of Delaware No Drawing. Application January 3, 1952, Serial No. 264,844

7 Claims. (Cl. 167—33)

This invention relates to a method for repelling insects. In one of its more specific aspects it relates to a method for repelling flies from a chosen area. In another of its more specific aspects it relates to a novel insect repelling composition.

Warfare against insects is not confined to methods and means for killing insects but often the desired result is to repel insects from a chosen area or object. This is true where protection of animals is concerned. It is also true in connection with eating places, as coatings for materials to be used in packaging foods, such as flour, and in other situations where it is more desirable to eliminate the presence of insects than to kill insects which are present.

In at least one aspect of the invention at least one of the following objects is attained. It is an object of the invention to provide a method for repelling insects. It is another object to provide a material for repelling insects. It is still another object to provide a method for repelling flies. It is still another object to provide a material for repelling flies. Other objects will be apparent to one skilled in the art upon reading the disclosure of the invention.

We have discovered that certain methylol picolines are effective repellents for insects. The methylol picolines of the present invention are represented by the general formula

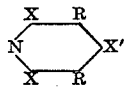

wherein X is selected from the group consisting of a dimethylol methyl radical, a trimethylol methyl radical, hydrogen and an alkyl radical containing not more than 4 carbon atoms and X' is selected from the group consisting of a monomethylol methyl radical in addition to the substituents named above for X. At least one of the X's or X' must be a methylol methyl radical within the limits set forth above. R is selected from the group consisting of hydrogen and an alkyl radical containing not more than 4 carbon atoms. The total number of carbon atoms in the molecule should not exceed 20. Typical compounds which are applicable to the invention include dimethylol-2-picoline, trimethylol-2-picoline, dimethylol-4-picoline, monomethylol-4-picoline, trimethylol-4-picoline, 4-methyl-5-ethyl trimethylol-2-picoline, and the like.

Not all N ring compounds are effective insect repellent materials, in fact not all methylol picolines are effective insect repellents. Thus, we have found that 2-methyl-5-ethyl pyridine and monomethylol-2-picoline are not satisfactory insect repellent materials.

The methylol picolines of our invention are effective agents for repelling insects such as flies, mosquitoes, and the like from surfaces frequented by them when applied to said surfaces in suitable form, such as solution, powder, emulsion, aerosol, cream, fog, lotion, or the like. By way of example, we have found that it is convenient to dissolve a methylol picoline or mixture of methylol picolines in a solvent, or otherwise employ them in a suitable carrier, and apply the composition so formed to a surface from which insects are to be repelled. Solvents or carriers which we have found applicable to the present invention include those materials which are substantially inert with respect to our repellents. Solvents useful for the purpose of the present invention include acetone, ethyl acetate, diethyl ether, pyridine, benzene and the like. Our selected methylol picolines can also be emulsified in water using suitable wetting or dispersing agents or they can be emulsified in petroleum solvents such as the higher boiling isoparaffinic hydrocarbons. Solid inert carrier materials such as talc, kieselguhr, and the like can be employed when preparing powders.

When employing the methylol picolines of our invention in a solvent or carrier, the concentration of the methylol picoline is governed by the method of application and so adjusted to apply a predetermined amount of the material per unit of area to be protected. In some instances, our methylol picolines can be advantageously applied without a carrier of any kind although it is usually preferred to employ a carrier. The use of commercially available methylol picolines containing small amounts of other pyridine derivatives as impurities is to be included within the scope of the invention.

The repellent materials of our invention can be applied for their intended purpose in several ways. The most advantageous and presently preferred method is to spray a liquid composition upon a surface from which insects are to be repelled. Aerosols, however, are employed advantageously in closed spaces. The amount of active repellent material to be applied will be determined by the properties of the surface to be covered, for example, absorptive power and by the properties of the repellent material, for example, vapor pressure, etc. Generally, when a liquid composition is sprayed upon a smooth surface, about 1 to 10 grams of active ingredient per 100 square feet of surface is advantageously applied. Larger or smaller amounts can be applied as desired.

The methylol picolines of the present invention can be prepared by methods well known in the art. One suitable method for their preparation is described in "Hetrocyclic Compounds" by Ederfield, volume I, Wiley, 1950, pages 582–3 wherein it is stated that the synthesis of the pyridine derivatives which have an alcohol group in the side chain in either the 2 or 4 position is readily accomplished by condensation of the 2- and 4-methyl pyridines with an aldehyde. The reaction is indicated in the following equation wherein 2-methyl pyridine is condensed with formaldehyde.

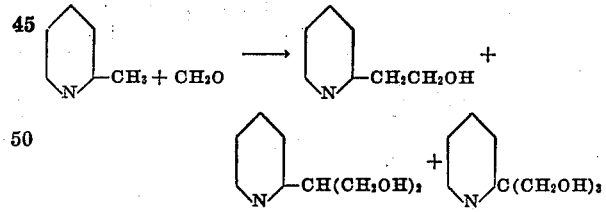

When formaldehyde is used, more than one aldehyde molecule may condense with a methyl group in the 2 or 4 position, with the result that a mixture of mono-, di- and tri-methylol picolines can be obtained.

The reaction does not occur with the 3-methyl pyridine derivatives.

Thus according to the practice of this invention there is provided a method and material for repelling insects which comprises applying certain methylol picolines to the area from which insects are to be repelled.

Example I

In accordance with the sandwich bait method described by L. B. Kilgore in "Soap," June 1939, several 1 x 4" strips of cardboard were coated with a smooth, thin film of unsulfured molasses leaving an uncoated margin of about ¼" on all four sides. The prepared cardboard strips were then oven-dried at 45° C.

Highly porous paper strips cut from cushion sheets used in mimeograph stencils were impregnated with varied amounts of the candidate repellents. Impregnation of porous strips was effected by immersing them in an acetone solution of the repellent and then allowing the strip to dry over a period of from 4 to 6 hours. The impregnated strips were the same size as the baited cardboards. An impregnated strip was superimposed on each baited cardboard and fastened in place by stapling. The loose fiber construction of the impregnated paper permits the flies to remove the molasses through it. The prepared strips, that is, the sandwich baits, were then exposed to house flies Musca domestica over five days old, which had been starved for six hours. Counts of the number of flies feeding on the strips were taken at intervals over a 2½-hour period. A non-repellent material in the sandwich bait becomes black with flies soon after being exposed and the bait will often be entirely consumed in five minutes. Results of tests using dimethylol-2-picoline, dimethylol-4-picoline, and monomethylol-4-picoline as fly repellents in accordance with the method described are recorded below:

| Compound | Wt. Percent Conc. | Solvent | Number of Flies Feeding | | | | | | | |
|---|---|---|---|---|---|---|---|---|---|---|
| | | | 5 Min. | 15 Min. | 30 Min. | 45 Min. | 60 Min. | 90 Min. | 120 Min. | 150 Min. |
| Dimethylol-4-picoline | 5 | Acetone | 0 | 2 | 1 | 0 | 2 | 0 | 1 | 1. |
| | 2.5 | ---do--- | 0 | 0 | 0 | 0 | 0 | 0 | 0 | 0. |
| | 1.25 | ---do--- | 0 | 0 | 0 | 0 | 0 | 0 | 0 | 0. |
| | .625 | ---do--- | 0 | 3 | 6 | 5 | 2 | 6 | 1 | gone.[1] |
| Monomethylol-4-picoline | 5 | ---do--- | 3 | 1 | 6 | 2 | 0 | 1 | 0 | 0. |
| | 2.5 | ---do--- | 7 | 5 | 4 | 1 | 5 | 2 | 1 | gone.[1] |
| Dimethylol-2-picoline | 5 | ---do--- | 3 | 13 | 9 | 3 | 1 | 2 | 6 | 3. |

[1] Molasses bait consumed.

Example II

A semi-practical test was conducted in a small room wherein flies were confined. It was noted that flies congregated on the windows of this room no matter what the light intensity on either side of the glass. In testing our fly repellents, these windows were cleaned and then sprayed with a one weight per cent acetone solution of the candidate repellent to provide about 0.02 gram of repellent per square foot of glass. After the solvent had evaporated, flies were introduced into the room. Dimethylol-4-picoline repelled flies from the windows for 24 hours.

Not all N-ring compounds are effective as insect repellent, thus monomethylol-2-picoline and 2-methyl-5-ethyl pyridine are not considered satisfactory as shown by Example III.

Example III

| Compound | Wt. Per cent Conc. | Solvent | Number of flies feeding | | | | | |
|---|---|---|---|---|---|---|---|---|
| | | | 4 Min. | 15 Min. | 30 Min. | 45 Min. | 60 Min. | 90 Min. |
| Monomethylol-2-picoline | 5 | Acetone | 29 | 10 | gone[1] | | | |
| 2-Methyl-5-ethyl pyridine | 5 | ---do--- | 39 | 30 | 5 | 4 | 3 | gone.[1] |

[1] Molasses bait consumed.

Reasonable variations and modifications are possible within the scope of the disclosure of the invention the essence of which is that certain methylol picolines have been found to be effective insect repellent materials.

I claim:

1. In a method for repelling insects from a locus, the improvement which comprises applying to said locus in repelling concentration and in an inert carrier a methylol picoline characterized by the formula

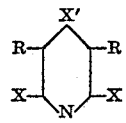

wherein X is a member selected from the group consisting of a dimethylol methyl radical, a trimethylol methyl radical, hydrogen and an alkyl radical containing not more than 4 carbon atoms; X' is a member selected from the group consisting of a monomethylol methyl radical, a dimethylol methyl radical, a trimethylol methyl radical, hydrogen and an alkyl radical containing not more than 4 carbon atoms; at least one of the group consisting of X and X' must be a methylol methyl radical within the limits set forth for each; R is selected from the group consisting of hydrogen and an alkyl radical containing not more than 4 carbon atoms; and the total carbon atoms in the molecule shall not exceed 20.

2. In a method for repelling flies from a locus, the improvement which comprises applying to said locus in repelling concentration and in an inert carrier a methylol picoline characterized by the formula

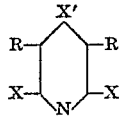

wherein X is a member selected from the group consisting of a dimethylol methyl radical, a trimethylol methyl radical, hydrogen and an alkyl radical containing not more than 4 carbon atoms; X' is a member selected from the group consisting of a monomethylol methyl radical, a dimethylol methyl radical, a trimethylol methyl radical, hydrogen and an alkyl radical containing not more than 4 carbon atoms; at least one of the group consisting of X and X' must be a methylol methyl radical within the limits set forth for each; R is selected from the group consisting of hydrogen and an alkyl radical containing not more than 4 carbon atoms; and the total carbon atoms in the molecule shall not exceed 20.

3. The method of claim 2 wherein the methylol picoline is dimethylol-4-picoline.

4. The method of claim 2 wherein the methylol picoline is monomethylol-4-picoline.

5. The method of claim 2 wherein the methylol picoline is dimethylol-2-picoline.

6. The method of claim 2 wherein the methylol picoline is trimethylol-4-picoline.

7. The method of claim 2 wherein the methylol picoline is trimethylol-2-picoline.

References Cited in the file of this patent

UNITED STATES PATENTS

| Number | Name | Date |
|---|---|---|
| 2,512,660 | Mahan | June 27, 1950 |

OTHER REFERENCES

Brown, Insect Control by Chemicals, page 130, 1951.